(12) United States Patent
Hashiguchi

(10) Patent No.: US 6,667,651 B2
(45) Date of Patent: Dec. 23, 2003

(54) VOLTAGE SUPPLY CIRCUIT AND CONTROL METHOD OF THE SAME

(75) Inventor: Akihiko Hashiguchi, Kanagawa (JP)

(73) Assignee: Sony Corporation (JP)

( * ) Notice: Subject to any disclaimer, the term of this patent is extended or adjusted under 35 U.S.C. 154(b) by 113 days.

(21) Appl. No.: 09/913,876

(22) PCT Filed: Dec. 21, 2000

(86) PCT No.: PCT/JP00/09078

§ 371 (c)(1),
(2), (4) Date: Dec. 7, 2001

(87) PCT Pub. No.: WO01/46767

PCT Pub. Date: Jun. 28, 2001

(65) Prior Publication Data

US 2002/0135416 A1 Sep. 26, 2002

(30) Foreign Application Priority Data

Dec. 22, 1999 (JP) ............................................ 11-365657
Dec. 22, 1999 (JP) ............................................ 11-365658
Dec. 22, 1999 (JP) ............................................ 11-365659

(51) Int. Cl.[7] .............................. G05F 1/10; G05F 3/02
(52) U.S. Cl. ........................ 327/538; 327/156; 327/534
(58) Field of Search ................................ 327/535, 538, 327/540, 541, 156, 157, 158

(56) References Cited

U.S. PATENT DOCUMENTS

| 5,585,754 A | 12/1996 | Yamashina et al. | 327/158 |
|---|---|---|---|
| 5,767,748 A | 6/1998 | Nakao | 331/57 |
| 5,914,631 A * | 6/1999 | Soneda | 327/535 |
| 6,414,527 B1 * | 7/2002 | Seno et al. | 327/158 |
| 6,448,840 B2 * | 9/2002 | Kao et al. | 327/534 |

FOREIGN PATENT DOCUMENTS

| EP | 1 008 923 A1 | 6/2000 |
|---|---|---|
| JP | 64-62715 | 3/1989 |
| JP | 10-155011 | 6/1998 |
| WO | WO 98/06022 | 1/1998 |

\* cited by examiner

Primary Examiner—Terry D. Cunningham
Assistant Examiner—Quan Tra
(74) Attorney, Agent, or Firm—Rader, Fishman & Grauer PLLC; Ronald P. Kananen

(57) ABSTRACT

A voltage supply circuit capable of dealing with an abrupt change of a load by controlling an amount of increase of a power source voltage to be larger than an amount of reduction, supplying a stable operating power source voltage, and realizing lower power consumption while maintaining normal operation of a semiconductor integrated circuit is provided. By providing a replica circuit 20, detecting a delay time of a critical path of an LSI 10, comparing a delay time detected by a control circuit 50 with a predetermined reference value, performing control to raise a voltage $V_{DD}$ supplied to the LSI 10 when the delay time is larger than the reference value as a result of the comparison and to lower the voltage $V_{DD}$ supplied to the LSI 10 when the delay time is smaller than the reference value, and making the amount of increase at the time of raising the supplied voltage larger than the amount of reduction at the time of lowering it, when the supplied voltage $V_{DD}$ becomes smaller than the reference value, it can be quickly restored to be larger than the reference value, the time when operating error of the LSI 10 may occur can be greatly shortened, and the operational stability of the voltage supply circuit can be improved.

23 Claims, 14 Drawing Sheets

FIG. 6A

| REPLICA VOLTAGE | LSI VOLTAGE |
|---|---|
| 3.0 | 3.3 |
| 3.2 | 3.6 |

FIG. 6B

| REPLICA VOLTAGE | DIFFERENCE FROM REPLICA VOLTAGE |
|---|---|
| 3.0 | 0.3 |
| 3.2 | 0.4 |

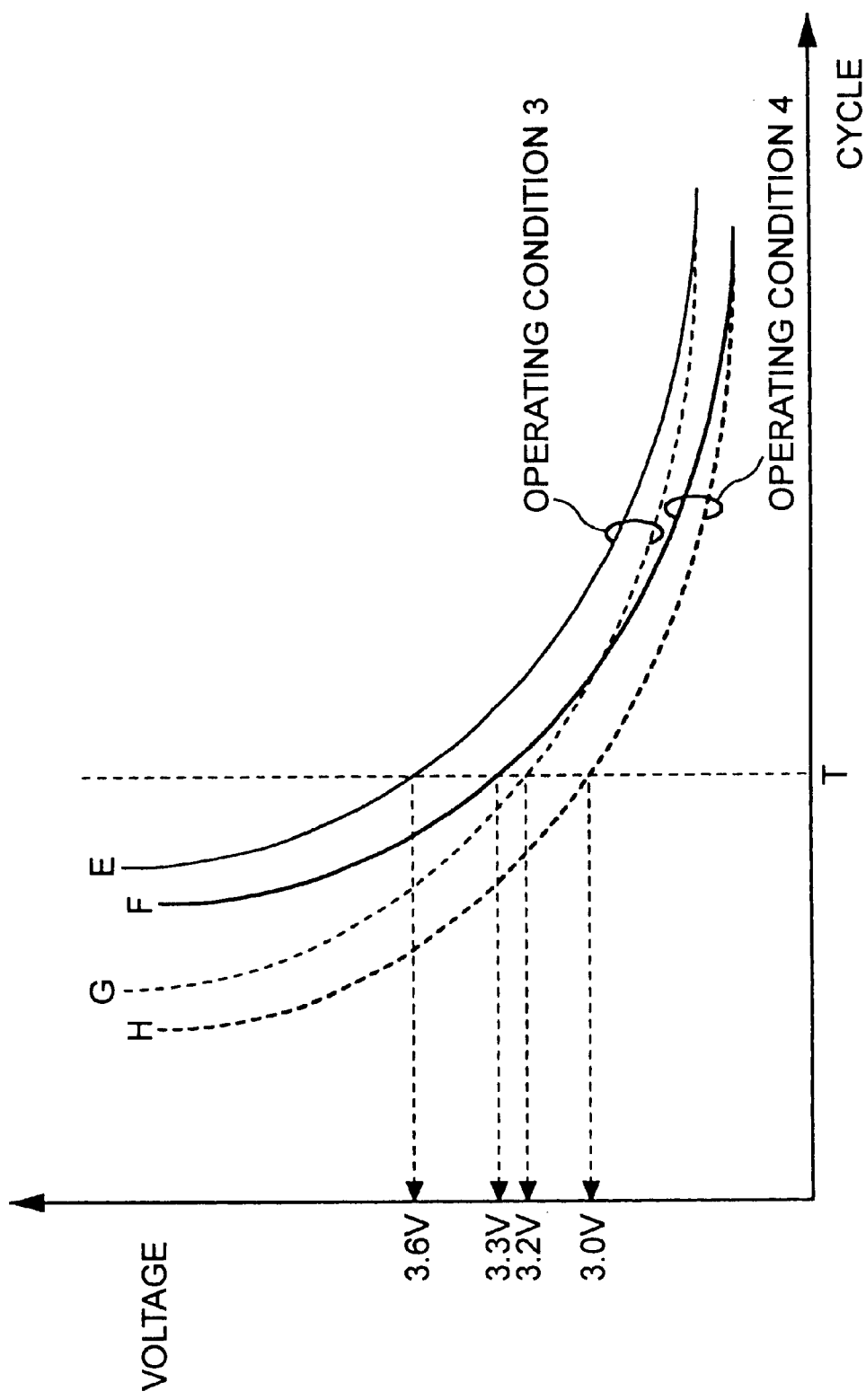

FIG. 10

| VOLTAGE | CONDITION A | CONDITION B |
|---|---|---|
| 2.5 | DELAY VALUE A1 | DELAY VALUE B1 |
| 2.6 | DELAY VALUE A2 | DELAY VALUE B2 |
| 2.7 | DELAY VALUE A3 | DELAY VALUE B3 |
| 2.8 | DELAY VALUE A4 | DELAY VALUE B4 |
| 2.9 | DELAY VALUE A5 | DELAY VALUE B5 |
| 3.0 | DELAY VALUE A6 | DELAY VALUE B6 |
| 3.1 | DELAY VALUE A7 | DELAY VALUE B7 |
| 3.2 | DELAY VALUE A8 | DELAY VALUE B8 |
| 3.3 | DELAY VALUE A9 | DELAY VALUE B9 |
| 3.4 | DELAY VALUE A10 | DELAY VALUE B10 |
| 3.5 | DELAY VALUE A11 | DELAY VALUE B11 |
| 3.6 | DELAY VALUE A12 | DELAY VALUE B12 |
| 3.7 | DELAY VALUE A13 | DELAY VALUE B13 |
| 3.8 | DELAY VALUE A14 | DELAY VALUE B14 |
| 3.9 | DELAY VALUE A15 | DELAY VALUE B15 |
| 4.0 | DELAY VALUE A16 | DELAY VALUE B16 |
| 4.1 | DELAY VALUE A17 | DELAY VALUE B17 |

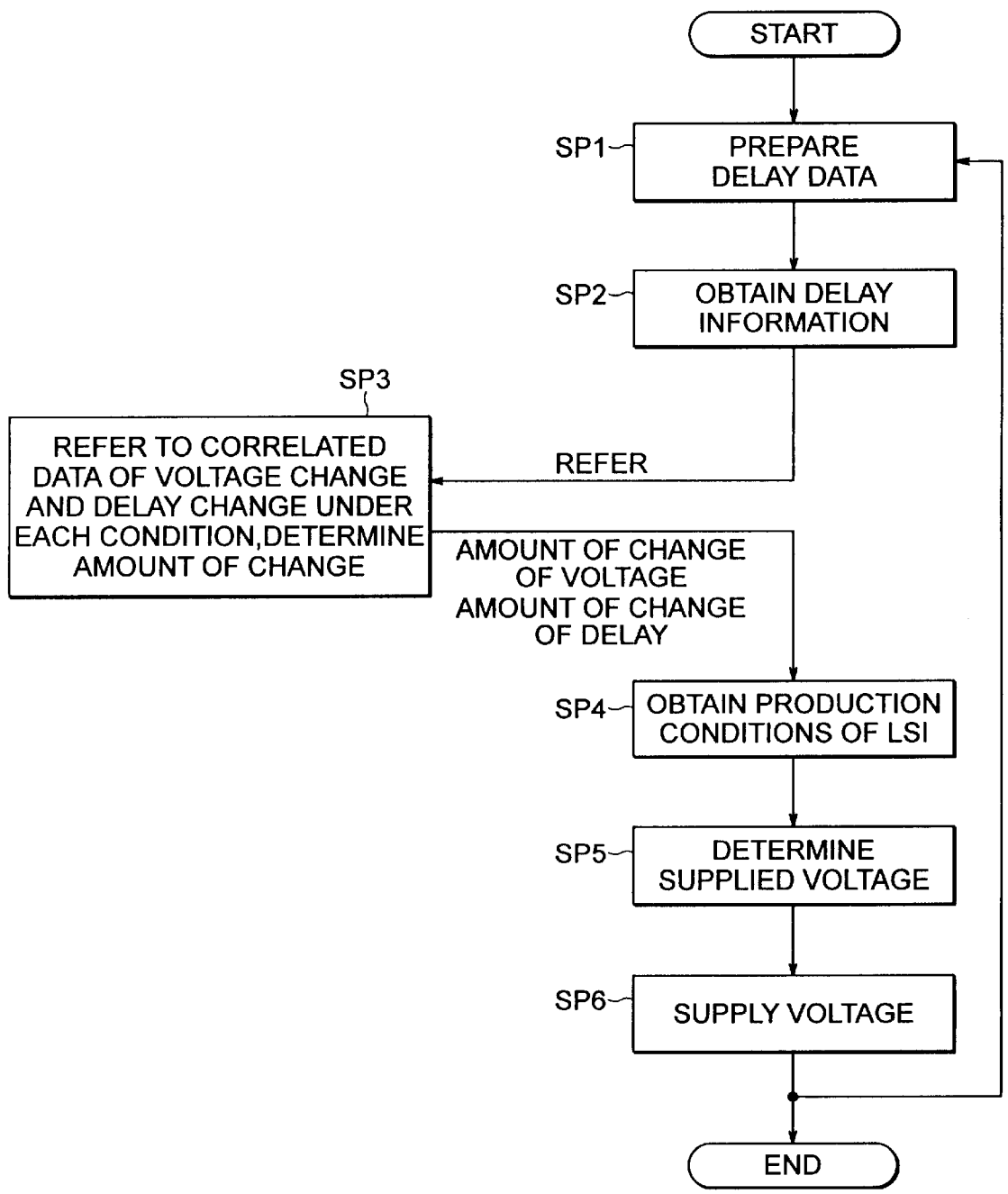

VOLTAGE SUPPLY CIRCUIT AND CONTROL METHOD OF THE SAME

TECHNICAL FIELD

The present invention relates to a voltage supply circuit, more particularly relates to a voltage supply circuit capable of realizing low power consumption by supplying to a semiconductor integrated circuit a minimum operating power source voltage required for maintaining normal operation and a control method of the voltage.

BACKGROUND ART

The power consumption of a semiconductor integrated circuit depends on the supplied operating power source voltage. On the other hand, when the operating power source voltage falls, the operating speed of the semiconductor integrated circuit falls. Accordingly, it is necessary to supply to the semiconductor integrated circuit a minimum operating power source voltage by which the operating speed of the semiconductor integrated circuit satisfies a predetermined reference value.

Generally, as a means to realize lower power consumption of an LSI (large-scale semiconductor integrated circuit), the delay time of a critical path in the LSI is constantly monitored and the voltage supplied to the LSI is controlled so that the delay time of the critical path becomes shorter than a certain reference value. Due to this control, a minimum voltage enabling the LSI to maintain normal operation is supplied and a lower power consumption can be realized while maintaining normal operation of the LSI.

A voltage supply circuit for supplying such a power source voltage normally comprises a replica circuit for monitoring a delay time of a critical path of the semiconductor circuit, a delay detection circuit for detecting the delay time of the replica circuit, a voltage generation circuit, and a control circuit for controlling a generated voltage of the same. The voltage generated by the voltage generation circuit is supplied as an operating power source voltage to the semiconductor integrated circuit and the replica circuit, respectively. Normally, the replica circuit is designed to have about the same delay time as that of a critical path in the semiconductor integrated circuit. Also, it is designed to have a slightly longer delay time than that of the critical path considering an operating margin of the LSI in some cases.

As explained above, the operating speed of a semiconductor integrated circuit changes in accordance with the power source voltage supplied. For example, the operating speed is high when the supplied power source voltage is high and conversely, the operating speed becomes low when the supplied power source voltage is low. The replica circuit is supplied with the same operating power source voltage as that of the semiconductor integrated circuit and has almost the same delay time as that of the critical path of the semiconductor integrated circuit, so the higher the supplied power source voltage, the shorter the delay time, and conversely the lower the supplied power source voltage, the longer the delay time. Therefore, whether or not the operating speed of the semiconductor integrated circuit satisfies a predetermined reference value can be judged by detecting the delay time of the replica circuit.

The operating voltage supplied can be controlled by inputting a predetermined signal to the replica circuit and detecting a time delay of an output signal corresponding thereto. Here, as the input signal, for example a one shot pulse or a cyclic clock signal is input to the replica circuit.

The delay time of the replica circuit can be detected in accordance with a time difference or a phase difference of an output signal of the replica circuit and the above input signal. Then, the detected delay time is compared with the predetermined reference value and the generated voltage of the voltage generation circuit is controlled in accordance with the result of the comparison. For example, when the delay time of the replica circuit is larger than the predetermined reference value, control is performed for raising an output voltage of the voltage generation circuit, while conversely, when the delay time of the replica circuit is smaller than or equal to the predetermined reference value, control is performed for lowering the output voltage of the voltage generation circuit.

As a result of the above control, the semiconductor integrated circuit is supplied with a minimum voltage for enabling normal operation and a lower power source consumption is attained.

In the above conventional voltage supply circuit explained above, however, when the delay time of the replica circuit detected by the delay detection circuit is larger than the predetermined reference value and the supplied voltage has to be raised, operating errors of the semiconductor integrated circuit may occur if the output from the voltage generation circuit, that is, the operating power source voltage, is not promptly raised. The delay time of the semiconductor integrated circuit and the replica circuit may become larger than the reference value when the circuit starts to operate or the load of the voltage generation circuit is abruptly increased. In this case, it is preferable that the supplied voltage of the voltage generation circuit be controlled to reach a desired voltage level in a short time to maintain the normal operation of the semiconductor integrated circuit.

In a conventional voltage supply circuit, however, there is a limit on the extent of control of the supplied voltage by the control circuit, so when it is necessary to quickly raise the supplied voltage, an operating delay arises and the operation of the semiconductor integrated circuit may become unstable for a certain time.

This will be explained in further detail with reference to FIG. 12 below.

For example, the control circuit detects that the delay time is larger than the reference value at a time A and requests the voltage generation circuit to raise the output voltage by a certain amount of increase. However, if the delay time is still larger than the predetermined reference value despite the amount of increase, the control circuit again requests the voltage generation circuit to raise the output voltage at a time B. By repeating the same, finally, the level of the supplied voltage is controlled to be high so that the delay time does not exceed the predetermined reference value, but there is a possibility that the semiconductor integrated circuit will not be able to normally operate during this time.

By controlling the amount of increase of the output voltage of the voltage generation circuit to be large, it is possible to deal with abrupt changes of the load etc. and possible to alleviate the above problem to some extent. However, when it is detected that the delay time of the semiconductor integrated circuit is lower than the predetermined reference value and the control circuit requests the voltage generation circuit to lower the output voltage, if the amount of reduction of the voltage is set to be large in the same way as the amount of increase, the operating voltage supplied abruptly falls and the semiconductor integrated circuit may become unable to normally operate. In this case, the control circuit may fall into an unstable condition of repeatedly requesting the voltage generation circuit to raise and reduce the amount of output voltage.

Also, in the above conventional voltage supply circuit, to make the characteristics of the replica circuit completely equivalent to those of the critical path inside the actual LSI, it is necessary that not only the number of gates of the critical path but also the interconnection capacitance and resistance of the critical path all be accurately imitated. This is difficult in practice. Therefore, the delay time detected by the replica circuit does not always accord with the delay time of the critical path of the actual LSI.

Here, as an example, the power source voltage-delay characteristic of the critical path under certain operating conditions 1 is indicated by the line A in FIG. 13, while the power source voltage-delay characteristic of the replica circuit for monitoring the delay time of the critical path is indicated by the line C. In a cycle T under the operating conditions, there is a difference of operating voltages between the critical path and the replica circuit of exactly $\Delta V$. On the other hand, the power source voltage-delay characteristic of the critical path under certain operating conditions 2 is indicated by the line B in FIG. 13, while the power source voltage-delay characteristic of the replica circuit for monitoring the delay time of the critical path is indicated by the line D. In a cycle T under the operating conditions, there is a difference of operating voltages between the critical path and the replica circuit of exactly $\Delta V'$. Such a difference in delay characteristics is caused for example by variability in the current capacity of transistors arising in the production process. In FIG. 13, $\Delta V$ is larger than $\Delta V'$ ($\Delta V > \Delta V'$).

When, for example, a giving a power source voltage margin of exactly $\Delta V'$ from the delay information of the replica circuit under the above conditions 2 to an LSI having such characteristics, under the operating conditions 1 of the LSI, the power source voltage becomes insufficient by exactly ($\Delta V - \Delta V'$) and the delay time increases and may lead to operating errors. Thus, in the case of such circuit characteristics, a margin of $\Delta V$ has to be added when controlling the power source voltage considering the operating conditions 1.

However, this margin is excessive in the case of the operating conditions 2. The power source voltage adjusted exactly by the margin becomes higher than the minimum voltage for maintaining normal operation of the LSI and results in wasteful power consumption.

Furthermore, the delay characteristics of the LSI, that is, the relationship between the power source voltage supplied and the delay time, changes in accordance with conditions of producing the LSI. A delay of an LSI is determined by the sum of a gate delay and an RC interconnection delay. Among these, the gate delay is determined by the value of a load capacitance to be driven divided by a current value of the transistor. Since the current capacity of a transistor depending on the power source voltage supplied, the gate delay changes in accordance with the power source voltage. On the other hand, the RC interconnection delay is constant regardless of the operating voltage when the current capacity of the buffer to be driven is large. For example, it is generally known that the time to shift to a power source voltage $V_{DD}$ level can be approximated as $(0.38 \times R \times C)$.

In production of an actual LSI, there are manufacturing variability in the interconnection resistance and interconnection capacitance relating to the RC components and manufacturing variability in the current carrying capacity of transistors relating to the gate delay of the transistors. FIG. 14 is graph of the delay characteristic of a LSI, that is, the relationship of the power source voltage and the delay value. In FIG. 14, the line A indicates the characteristic of an LSI when it ends up as designed, the line B indicates the characteristic of an LSI when the current capacity of the transistor is lower than a design value and an interconnection resistance and interconnection capacitance end up as designed, the line C indicates the characteristic of an LSI when the current capacity of the transistor ends up as designed and the interconnection resistance and interconnection capacitance end up larger than the design values, the line D is an interconnection delay value when an interconnection delay is given as designed, and the line E is an interconnection delay value when a larger interconnection delay than a design value is given. Namely, the component of the line D is included as an interconnection delay value in the line A and line B, and the component of the line E is included as an interconnection delay value in the line C.

As shown in FIG. 14, when there are several patterns of the operating voltage and delay time, the extent of the effect of a change in the operating voltage on the delay value becomes irregular, so it is difficult to determine how much the voltage has to be changed. Particularly, if the voltage is lowered assuming the characteristic of the line C, when the characteristic of the actual LSI is that of the line B, the amount of variability of the delay becomes large, a delay value not satisfying the operating frequency specification is given, and operating error may occur.

DISCLOSURE OF INVENTION

The present invention was made in consideration with the above circumstances and has as an object thereof to provide a voltage supply circuit capable of dealing with an abrupt change of a load and supplying a stable operating power source voltage by controlling an amount of increase and amount of reduction of an output voltage of a voltage generation circuit to be mutually different, capable of attaining a lower power consumption by deducing operating conditions of an LSI from delay information detected by a replica circuit and suitably correcting an operating voltage margin, and capable of realizing lower power consumption by deducing operating conditions of the LSI by further detecting an amount of change of the delay information while maintaining normal operation of a semiconductor integrated circuit and a method of controlling the voltage.

To attain the above object, a voltage supply circuit according to a first aspect of the present invention comprises a functional circuit for performing predetermined processing in accordance with an input signal at an operating speed based on a power source voltage supplied and outputting a processing result after a predetermined delay time from when said input signal is received, a delay detection circuit for detecting a delay time of said functional circuit, a control circuit for outputting a control signal to control said power source voltage to raise or lower it in accordance with a delay time detected by said delay detection circuit and to make an amount of change at the time of raising said power source voltage larger than an amount of change at the time of lowering it, and a voltage generation circuit for generating a voltage in accordance with said control signal and supplying it as said power source voltage to said functional circuit.

Also, in the present invention, preferably said delay detection circuit comprises a replica circuit having about the same delay time as that of a critical path of said functional circuit and a delay time detection circuit for inputting a predetermined signal to said replica circuit and detecting a delay time of an output signal corresponding to the input signal.

Also, in the present invention, preferably said control circuit comprises a comparison circuit for comparing a delay time detected by said delay time detection circuit with a reference value set in advance and outputs a control signal to raise the output voltage of said voltage generation circuit by a first amount of change when the result of said comparison is that said detected delay time is larger than said reference value and to lower the output voltage of said voltage generation circuit by a second amount of change smaller than said first amount of change when the result is that said detected delay time is smaller than said reference value.

Alternatively, in the present invention, preferably said control circuit comprises a means for finding a difference of a delay time detected by said delay time detection circuit and a reference value set in advance and a voltage change determining means for setting said amount of change of voltage in accordance with said difference of the delay time and the reference value.

A voltage supply circuit according to a second aspect of the present invention comprises a functional circuit for performing predetermined processing in accordance with an input signal at an operating speed based on a power source voltage supplied and outputting a processing result after a predetermined delay time from when said input signal is received, a replica circuit having almost the same delay time as that of a critical path of said functional circuit, a delay detection circuit for detecting a delay time of said replica circuit, a control circuit for finding a power source voltage by which a delay time of the replica circuit satisfies a predetermined reference value in accordance with a delay time detected by said delay detection circuit, finding a power source voltage to be supplied to said functional circuit based on a relationship of a power source voltage of said replica circuit and a power source voltage of said functional circuit under the same operating conditions, and outputting a control signal in accordance with the power source voltage, and a voltage generation circuit for generating a voltage in accordance with said control signal and supplying it as said power source voltage to said functional circuit.

Also, the present invention preferably comprises a database indicating a relationship of said replica circuit and a power source voltage supplied to said functional circuit so that a delay time of said replica circuit and a delay time of the critical path of said functional circuit becomes equal under the same operating conditions, and said control circuit finds a voltage for supplying to said functional circuit corresponding to said found voltage for supplying to said replica circuit based on said database.

Also, the present invention preferably comprises a formula indicating a relationship of said replica circuit and a power source voltage supplied to said functional circuit so that a delay time of said replica circuit and a delay time of the critical path of said functional circuit becomes equal under the same operating conditions, and said control circuit finds a voltage for supplying to said functional circuit corresponding to said found voltage for supplying to said replica circuit based on said formula.

Furthermore, a voltage supply circuit according to a third aspect of the present invention comprises a functional circuit for performing predetermined processing in accordance with an input signal at an operating speed based on a power source voltage supplied and outputting a processing result after a predetermined delay time from when said input signal is received, a delay detection circuit for detecting a delay time of said functional circuit, a control circuit for obtaining an amount of change of a delay time corresponding to an amount of change of said power source voltage in accordance with a delay time detected by said delay detection circuit, deducing production conditions based on information regarding a power source voltage and a delay time under different production conditions found in advance, finding a power source voltage to be supplied to said functional circuit under the deduced production conditions, and outputting a control signal in accordance with the power source voltage, and a voltage generation circuit for generating a voltage in accordance with said control signal and supplying it as said power source voltage to said functional circuit.

Also, the present invention preferably comprises a database indicating a relationship of said power source voltage and delay time under different operating conditions, and said control circuit deduces production conditions based on an amount of change of said found power source voltage and an amount of change of said delay time and said database and finds a power source voltage by which said functional circuit normally operates under the production conditions based on said database in accordance with said deduced production conditions.

Also, in the present invention, preferably said control circuit comprises a first storage means for storing a delay time detected at a previous time and a set power source voltage and a second storage means for storing a delay time detected at a current time and a set power source voltage and calculates an amount of change of said power source voltage and an amount of change of a delay time in accordance therewith in accordance with data stored in said first and second storage means.

Also, the present invention preferably comprises a replica circuit based on the critical path of said functional circuit, and said delay detection circuit detects a delay time of said replica circuit.

Also, a voltage control method according to a first aspect of the present invention is a voltage control method for supplying a minimum power source voltage by which a functional circuit for performing a predetermined function normally operates, including the steps of detecting a delay time of said functional circuit, raising or lowering said power source voltage in accordance with said detected delay time, setting an amount of change at the time of raising said power source voltage larger than an amount of change at the time of lowering it, and changing said power source voltage in accordance with said set amount of change and supplying it to said functional circuit.

Also, a voltage control method according to a second aspect of the present invention is a voltage control method for supplying a minimum power source voltage by which a functional circuit for performing a predetermined function normally operates, including the steps of detecting a delay time of a replica circuit for monitoring a delay time of said functional circuit, finding a power source voltage by which a delay time of the replica circuit satisfies a predetermined reference value in accordance with a detected delay time of said replica circuit, finding a power source voltage to be supplied to said functional circuit corresponding to said found power source voltage of the replica circuit based on a relationship of a power source voltage supplied to said replica circuit and a power source voltage supplied to said functional circuit under the same operating conditions, and generating said found power source voltage to be supplied to the functional circuit and supplying it to said functional circuit.

Also, a voltage control method according to a third aspect of the present invention is a voltage control method for supplying a minimum power source voltage by which a functional circuit for performing a predetermined function operates normally, including the steps of detecting a delay time of said functional circuit, obtaining an amount of change of a power source voltage supplied to the functional circuit and an amount of change of a delay time corresponding to the amount of change of the power source voltage in accordance with said detected delay time of the functional circuit, deducing production conditions based on said amount of change of the power source voltage and an amount of change of a delay time and a relation between the power source voltage and the delay time obtained in advance, finding a power source voltage to be supplied to said functional circuit under the deduced production conditions, and generating said power source voltage to be supplied and supplying it to said functional circuit.

According to the present invention, a replica circuit having almost the same delay time as that of the critical path of a functional circuit is provided corresponding to the functional circuit for performing predetermined processing in accordance with an input signal, and the functional circuit and the replica circuit are supplied with a power source voltage generated by a voltage generation circuit. The delay time at the time a predetermined input signal is input to the replica circuit is detected by the delay detection circuit, and a control circuit controls the power source voltage supplied to raise or lower it in accordance with a result of comparing the detected delay time and a predetermined reference value. Furthermore, by setting an amount of change of voltage at the time of raising the power source voltage larger than an amount of change of voltage at the time of lowering it, when the power source voltage falls due to a change of the load etc. and the delay time of the critical path of the functional circuit exceeds the predetermined reference value, the power source voltage can be restored to the reference value or more in a short time, the probability of occurrence of operating error in the functional circuit can be kept low, and instability of voltage control can be eliminated by gradually lowering the voltage level by small amounts at the time of lowering the power source voltage.

Also, according to the present invention, when the delay times of the replica circuit and the functional circuit, that is, the critical path of the LSI, differ under the same operating conditions due to variability of semiconductor elements etc., the relationship of an operating power source voltage of the replica circuit and an operating power source voltage of the LSI under different operating conditions are found in advance, the power source voltage supplied to the replica circuit is found in accordance with the delay time of the replica circuit detected during circuit operation, and the power source voltage supplied to the LSI is found based on the relationship of the operating power source voltage of the replica circuit and the operating power source voltage of the LSI found in advance. As a result, an error of the deduced operating power source voltage due to variability of the delay times of the replica circuit and the functional circuit can be corrected, a minimum power source voltage required for normally operating the LSI can be supplied, and a lower power consumption can be realized.

Furthermore, according to the present invention, when the delay characteristics of the functional circuit, that is, the LSI, change due to variability of production conditions etc., the amount of change of the power source voltage supplied to the LSI and the amount of change of the delay time in accordance therewith are detected, a database indicating the relationship of the power source voltage and delay time of the LSI under different production conditions is found in advance, an amount of change of the power source voltage supplied and an amount of change of the delay time can be found in accordance with the delay time of the LSI detected during circuit operation, the production conditions of the LSI can be deduced by referring to the database, and a power source voltage to be supplied to the LSI can be found based on the deduced production conditions.

As a result, estimation error of a power source voltage due to variability of production conditions of the LSI can be corrected, a minimum power source voltage required for operating the LSI normally can be supplied, and a lower power consumption can be realized.

BRIEF DESCRIPTION OF THE DRAWINGS

FIG. 6 is a view of a database indicating the relationship of a supplied voltage of a replica circuit and the supplied voltage of an LSI.

FIG. 7 is a graph indicating the relationship of a supplied voltage of the replica circuit and a supplied voltage of the LSI under different operating conditions.

FIG. 10 is a view of a database indicating the relationship of an operating voltage and delay value of an LSI.

FIG. 11 is a flow chart of an operation of the voltage supply circuit in FIG. 1.

BEST MODE FOR CARRYING OUT THE INVENTION

First Embodiment

Figure 1:
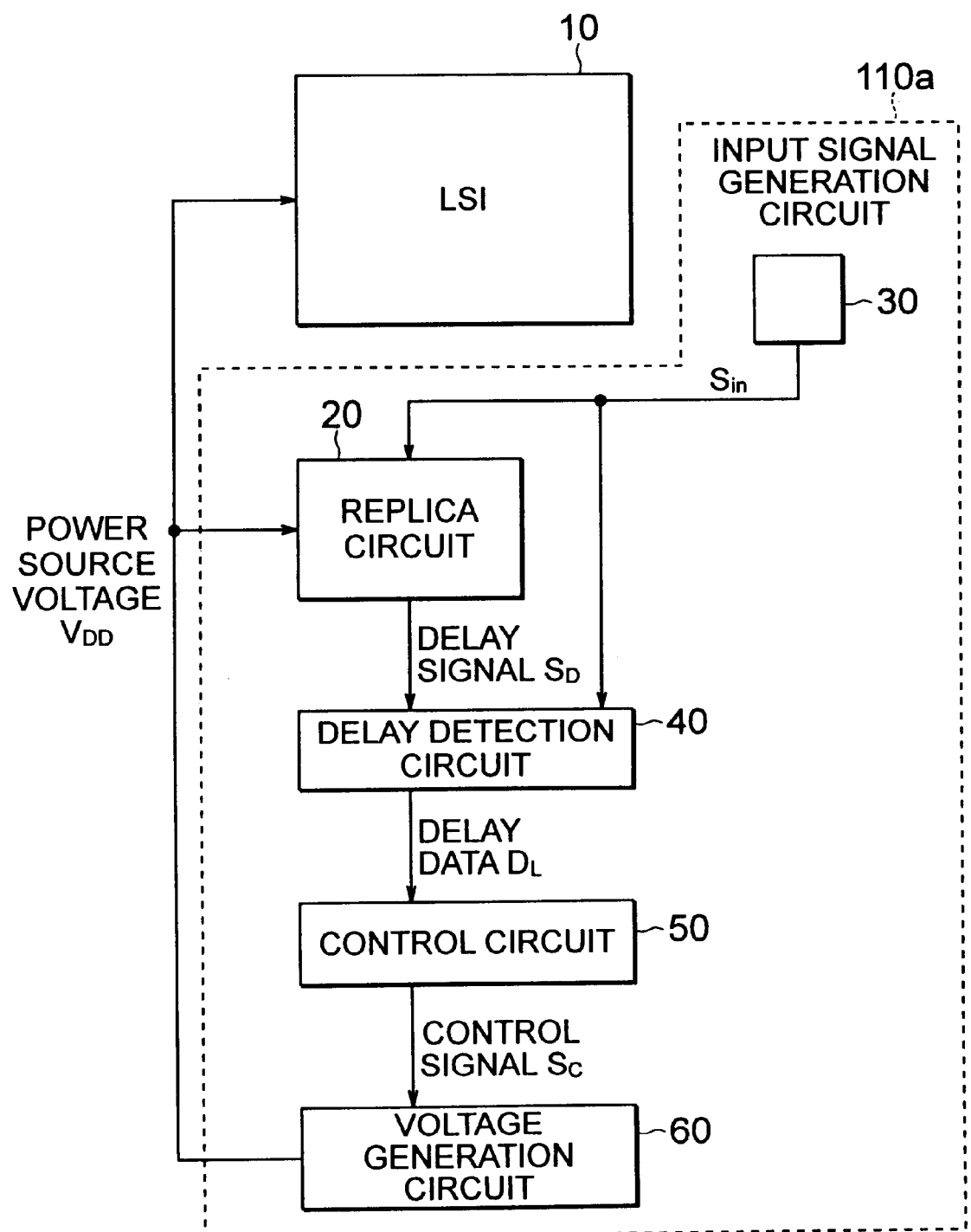
FIG. 1 is a circuit diagram of a first embodiment of a voltage supply circuit according to the present invention.

FIG. 1 is a circuit diagram of a first embodiment of a voltage supply circuit according to the present invention.

As shown in the figure, a voltage supply circuit 100 of the present embodiment comprises an input signal generation circuit 30, a replica circuit 20, a delay detection circuit 40, a control circuit 50, and a voltage generation circuit 60. A power source voltage $V_{DD}$ output by the voltage supply circuit 100 is supplied to an LSI 10 and the replica circuit 20.

The LSI 10 is a functional circuit having a predetermined processing function and performs predetermined signal processing in accordance with an input signal and outputs the processing result.

The replica circuit 20 is designed corresponding to a critical path of the LSI 10 and is a circuit for monitoring a delay time of the critical path of the LSI 10. Since the replica circuit 20 and the LSI 10 are supplied with the same operating power source voltage $V_{DD}$, the replica circuit 20 has almost the same delay time as that of the critical path of the LSI 10 in accordance with a change of the power source voltage $V_{DD}$.

The input signal generation circuit 30 generates a signal $S_{in}$ for input to the replica circuit 20. Here, the input signal $S_{in}$ generated by the input signal generation circuit 30 is, for example, a one shot pulse or a cyclic clock signal.

The replica circuit 20 outputs a delay signal $S_D$ obtained by delaying the input signal $S_{in}$ by a predetermined delay time $T_D$. The delay detection circuit 40 detects the delay time $T_D$ of the output signal $S_D$ of the replica circuit 20 with respect to the input signal $S_{in}$ and outputs delay data $D_L$.

The control circuit 50 outputs a control signal $S_C$ for controlling a generated voltage to the voltage generation circuit 60 in accordance with the delay data $D_L$ output by the delay detection circuit 40. The control circuit 50 compares the input delay data $D_L$ with a predetermined reference value $D_R$ and outputs a control signal $S_C$ to raise or lower the generated voltage in accordance with the result of the comparison. In the voltage supply circuit 100 of the present embodiment, the amount of change of voltage is controlled to be different when the control circuit 50 controls the output voltage $V_{DD}$ of the voltage generation circuit 60 to raise or lower it.

The voltage generation circuit 60 controls a level of the voltage $V_{DD}$ generated in accordance with the control signal $S_C$ from the control circuit 50 and supplies the generated voltage $V_{DD}$ to the LSI 10 and the replica circuit 20.

Figure 2:
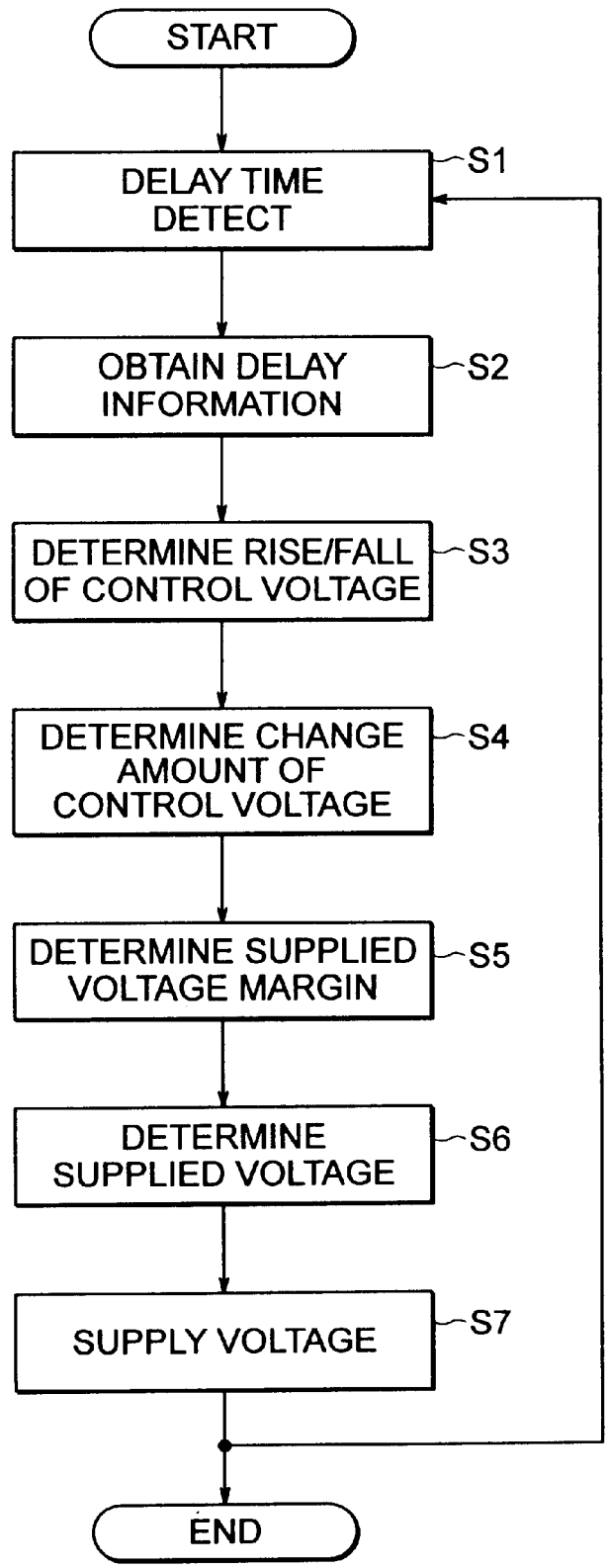
FIG. 2 is a flow chart of an operation of the voltage supply circuit of the first embodiment.

FIG. 2 is a flow chart of an operation of the voltage supply circuit 100 of the present embodiment. Below, the operation of the voltage supply circuit 100 of the present embodiment will be explained in detail with reference to FIGS. 1 and 2.

In the flow chart in FIG. 2, step S1 is performed by the delay detection circuit 40, while steps S2 to S6 are control steps performed by the control circuit 50.

First, at step S1, a delay time $T_D$ of the replica circuit 20 is detected by the delay detection circuit 40, and delay data $D_L$ in accordance therewith is output. The control circuit 50 receives the delay data $D_L$ and obtains the delay information of the LSI 10 (step S2). Then, the control circuit 50 determines whether the power source voltage $V_{DD}$ to be supplied to the LSI 10 is to be raised, lowered, or maintained in level based on the delay information (step S3). For example, the control circuit 50 compares the input delay data $D_L$ with the predetermined reference value $D_R$ and, when the delay data $D_L$ is larger than the reference value $D_R$, judges that the operating speed of the LSI 10 does not satisfy the predetermined reference value and decides to lower the power source voltage $V_{DD}$. On the other hand, when the delay data $D_L$ and the reference value $D_R$ are almost the same, it decides to maintain the power source voltage $V_{DD}$ at that level.

Next, the control circuit 50 determines the amount of change of the power source voltage $V_{DD}$ supplied by the voltage supply circuit 60 (step S4). For example, when the amount of increase is $\Delta V_A$ when raising the power source voltage $V_{DD}$ and the amount of reduction is $\Delta V_B$ when lowering the power source voltage $V_{DD}$, the control circuit 50 controls the voltage to satisfy $\Delta V_A > \Delta V_B$. By setting the amount of increase $\Delta V_A$ of the power source voltage $V_{DD}$ large, when it is judged that the delay time of the LSI 10 is larger than the reference value, it becomes possible to quickly raise the power source voltage $V_{DD}$ supplied to return the delay time of the LSI 10 to a normal value in a short time and to shorten the time when operating error may occur. When it is judged that the delay time of the LSI 10 is smaller than the reference value, it is possible to prevent the operation from becoming unstable because of an abrupt fall of the power source voltage $V_{DD}$ by not abruptly lowering the power source voltage $V_{DD}$ supplied to the LSI 10 but by gradually lowering it by small amounts.

The control circuit 50 determines the amount of change of the power source voltage $V_{DD}$ as explained above and adds a necessary margin to that to determine the supplied voltage $V_{DD}$ of the voltage generation circuit 60 and outputs a control signal $S_C$ in accordance therewith to the voltage generation circuit 60 (steps S5 and S6). In accordance with this, the voltage generation circuit 60 generates the power source voltage $V_{DD}$ based on the instruction of the control circuit 50 and supplies the same to the LSI 10 and the replica circuit 20 (step S7).

Figure 3:
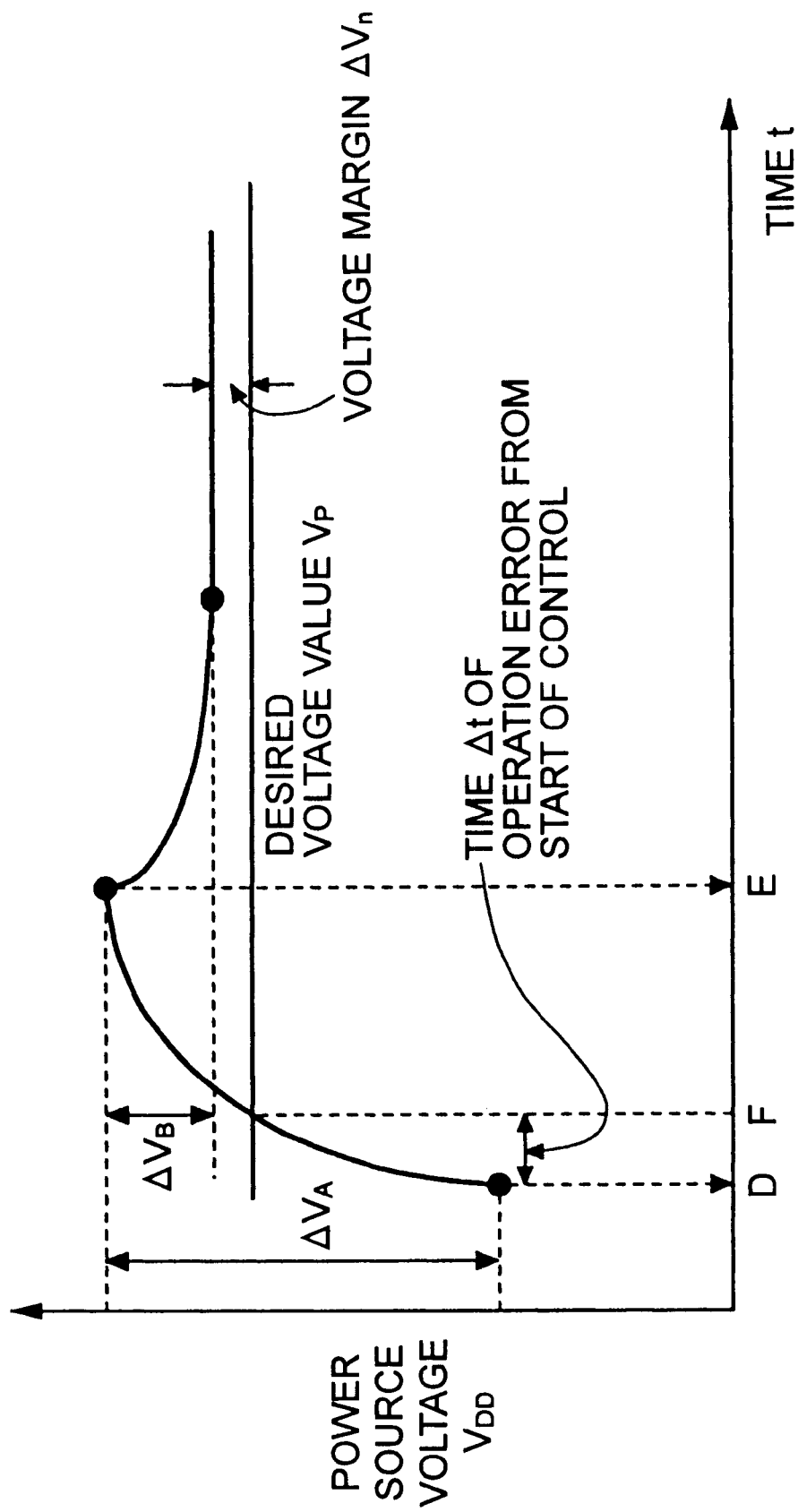
FIG. 3 is a view of a waveform of a supplied voltage of the voltage supply circuit of the first embodiment.

FIG. 3 is a view of an example of the supplied voltage $V_{DD}$ of the voltage generation circuit 60 obtained by the above explained control. As shown in the figure, the control circuit 50 detects that the delay data $D_L$ becomes larger than the reference value $D_R$ at a time D, determines in accordance therewith an amount of increase for raising the supplied voltage of the voltage generation circuit and a voltage margin, and outputs a control signal $S_C$. In accordance with this, the supplied voltage $V_{DD}$ is raised by an amount of increase $\Delta V_A$ by the voltage generation circuit 60. As a result, the power source voltage $V_{DD}$ is quickly raised to reach a desired voltage value $V_P$ at a time F. The LSI 10 can normally operate by this voltage. Due to such control, a time $\Delta t$ from the start of the control to when operating error is prevented is short and the effect caused by operating error can be kept to a minimum.

At a time E, the power source voltage $V_{DD}$ fully reaches the amount of increase $\Delta V_A$ determined by the control circuit 50. At this time, it is already detected by the control circuit 50 that the delay time $T_D$ of the replica circuit has become smaller than the predetermined reference value. In accordance with this, the control circuit 50 determines an amount of reduction for lowering the supplied voltage $V_{DD}$ of the voltage generation circuit 60 and a voltage margin and outputs a control signal $S_C$. In accordance therewith, the supplied voltage $V_{DD}$ of the voltage generation circuit 60 falls by an amount of reduction of $\Delta V_B$. Finally, the supplied voltage $V_{DD}$ is stabilized to a level higher than a desired voltage value VD exactly by an amount of a voltage margin $\Delta V_M$.

Note that the amount of increase $\Delta V_A$ and the amount of reduction $\Delta V_B$ of the supplied voltage $V_{DD}$ set by the control circuit 50 are fixed values set in advance in the above control, but control of the amount of change of the supplied voltage is not limited to that. For example, the amount of change of the voltage can be made variable and the amount of change of the supplied voltage $V_{DD}$ can be controlled in accordance with the delay data $D_L$ found by the delay detection circuit 40. For example, by controlling an amount of change of the supplied voltage $V_{DD}$ in accordance with a result of comparison of the delay data $D_L$ with a reference value $D_R$ set in advance, controlling the amount of change of the supplied voltage $V_{DD}$ to be large when the difference between the delay data $D_L$ and the reference value $D_R$ is large, and conversely controlling the amount of change of the supplied voltage $V_{DD}$ to be small when the difference between the delay data $D_L$ and the reference value $D_R$ is small, the operating power source voltage $V_{DD}$ of the LSI can be raised or lowered exactly by a necessary amount, so the most suitable control can be realized.

As explained above, according to the present embodiment, by providing the replica circuit 20, detecting a delay time of the critical path of the LSI 10, comparing the delay time detected by the control circuit 50 with a predetermined reference value, performing control to raise a voltage $V_{DD}$ supplied to the LSI 10 when the result of the comparison is that the delay time is larger than the reference value and to lower the voltage $V_{DD}$ supplied to the LSI 10 when the result is that the delay time is smaller than the reference value, and controlling the amount of increase at the time of raising the supplied voltage $V_{DD}$ to be larger than the amount of reduction at the time of lowering it, when the supplied voltage $V_{DD}$ falls below the reference value, the supplied voltage $V_{DD}$ can be quickly restored to be larger than the reference value, the time when operating error of the LSI 10 can occur can be greatly shortened, and the operational stability of the voltage supply circuit can be improved.

Second Embodiment

Figure 4:
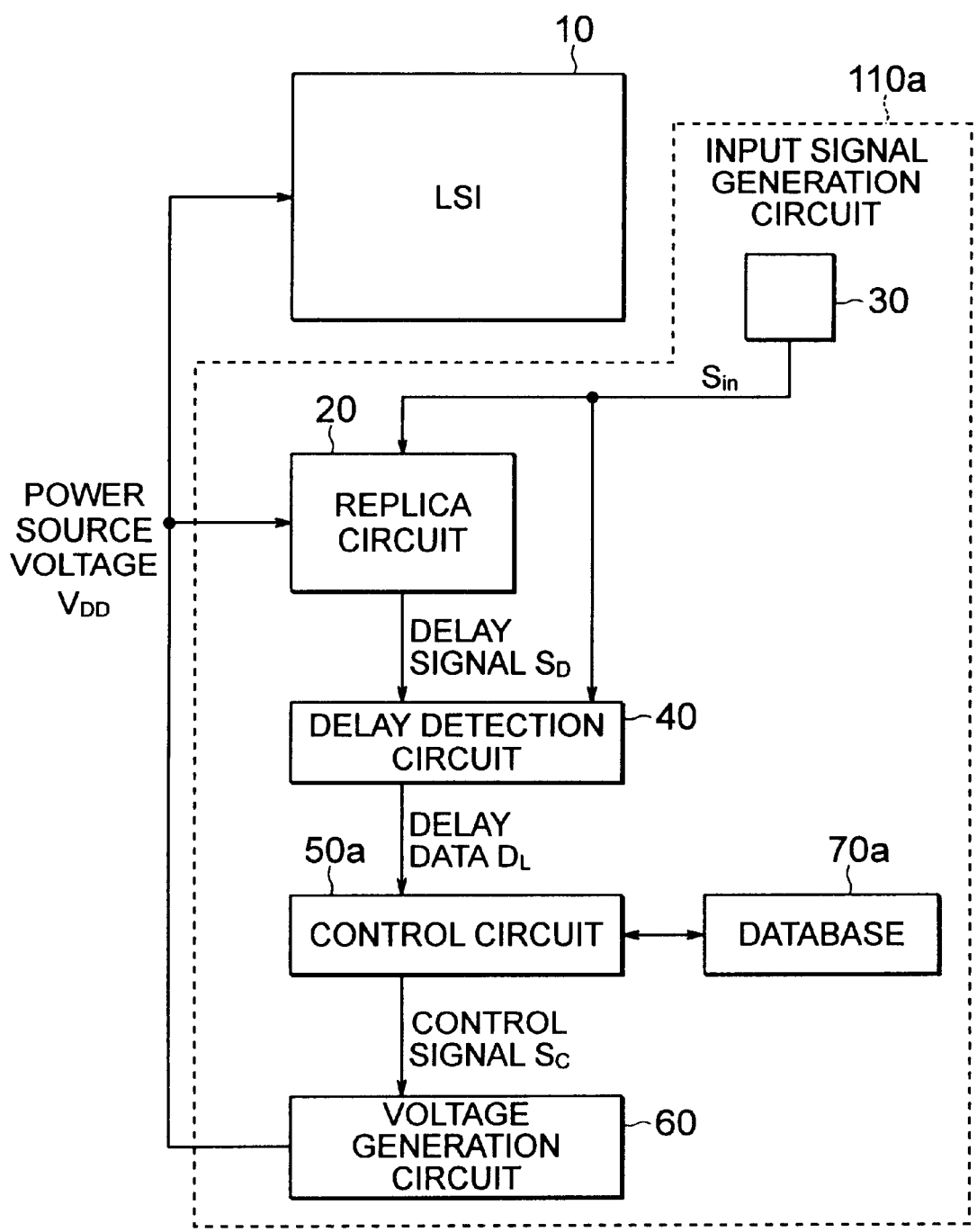
FIG. 4 is a circuit diagram of a second embodiment of a voltage supply circuit according to the present invention.

FIG. 4 is a circuit diagram of a second embodiment of a voltage supply circuit according to the present invention.

As shown in the figure, a voltage supply circuit 100*a* of the present embodiment comprises an input signal generation circuit 30, a replica circuit 20, a delay detection circuit 40, a control circuit 50*a*, a voltage generation circuit 60, and a database 70*a*. A power source voltage $V_{DD}$ output by the voltage supply circuit 100*a* is supplied to an LSI 10 and the replica circuit 20.

The LSI 10 is a functional circuit having a predetermined processing function and performs predetermined signal processing in accordance with an input signal and outputs the processing result.

The replica circuit 20 is designed corresponding to a critical path of the LSI 10 and is a circuit for monitoring a delay time of the critical path of the LSI 10. Since the replica circuit 20 and the LSI 10 are supplied with the same operating power source voltage $V_{DD}$, the replica circuit 20 has almost the same delay time as that of the critical path of the LSI 10 in accordance with a change of the power source voltage $V_{DD}$. However, in actuality, due to variability in the production process and other factors, the delay time of the replica circuit 20 may differ from the delay time of the critical path of the LSI 10 even if the operating conditions are the same. Therefore, the delay time detected by the replica circuit 20 has to be corrected in accordance with the operating conditions. The correction is made for example by the control circuit 50*a*. Note that the correction will be explained in further detail later.

The input signal generation circuit 30 generates a signal $S_{in}$ for input to the replica circuit 20. Here, the input signal $S_{in}$ generated by the input signal generation circuit 30 is, for example, a one shot pulse or a cyclic clock signal.

The replica circuit 20 outputs a delay signal $S_D$ obtained by delaying the input signal $S_{in}$ by a predetermined delay time $T_D$. The delay detection circuit 40 detects the delay time $T_D$ of the output signal $S_D$ of the replica circuit 20 with respect to the input signal $S_{in}$ and outputs delay data $D_L$.

The control circuit 50*a* outputs a control signal $S_C$ for controlling a generated voltage to the voltage generation circuit 60 in accordance with the delay data $D_L$ output by the delay detection circuit 40. The control circuit 50*a* actually calculates a voltage margin based on the input delay data $D_L$ and sets a value including the margin as a supplied voltage. Note that there are a variety of methods for determining the voltage margin, but for example, a database 70*a* indicating the relationship between the delay time of the replica circuit 20 and the voltage margin is prepared in advance based on the actually measured data. The database 70*a* stores data indicating the relationship between a power source voltage required by a critical path inside the LSI and a set voltage to the replica circuit 20 through evaluation of the characteristics of the LSI 10 in advance.

The control circuit 50*a* can find the set voltage of the replica circuit 20 in accordance with a detected delay time of the replica circuit and find a voltage margin required by the critical path of the LSI 10 based on the database 70*a*.

It is also possible, based on actually measured data, to devise a formula defining the relationship of the delay characteristics of the replica circuit and the voltage margin and to have the control circuit 50*a* calculate the necessary voltage margin by using the formula in accordance with the detected delay time of the replica circuit.

The control circuit 50*a* outputs a control signal $S_C$ for controlling an output voltage $V_{DD}$ of the voltage generation circuit 60 in accordance with the found voltage margin.

The voltage generation circuit 60 controls the level of the voltage $V_{DD}$ generated in accordance with the control signal $S_C$ from the control circuit 50*a* and supplies the generated voltage $V_{DD}$ to the LSI 10 and the replica circuit 20.

Figure 5:
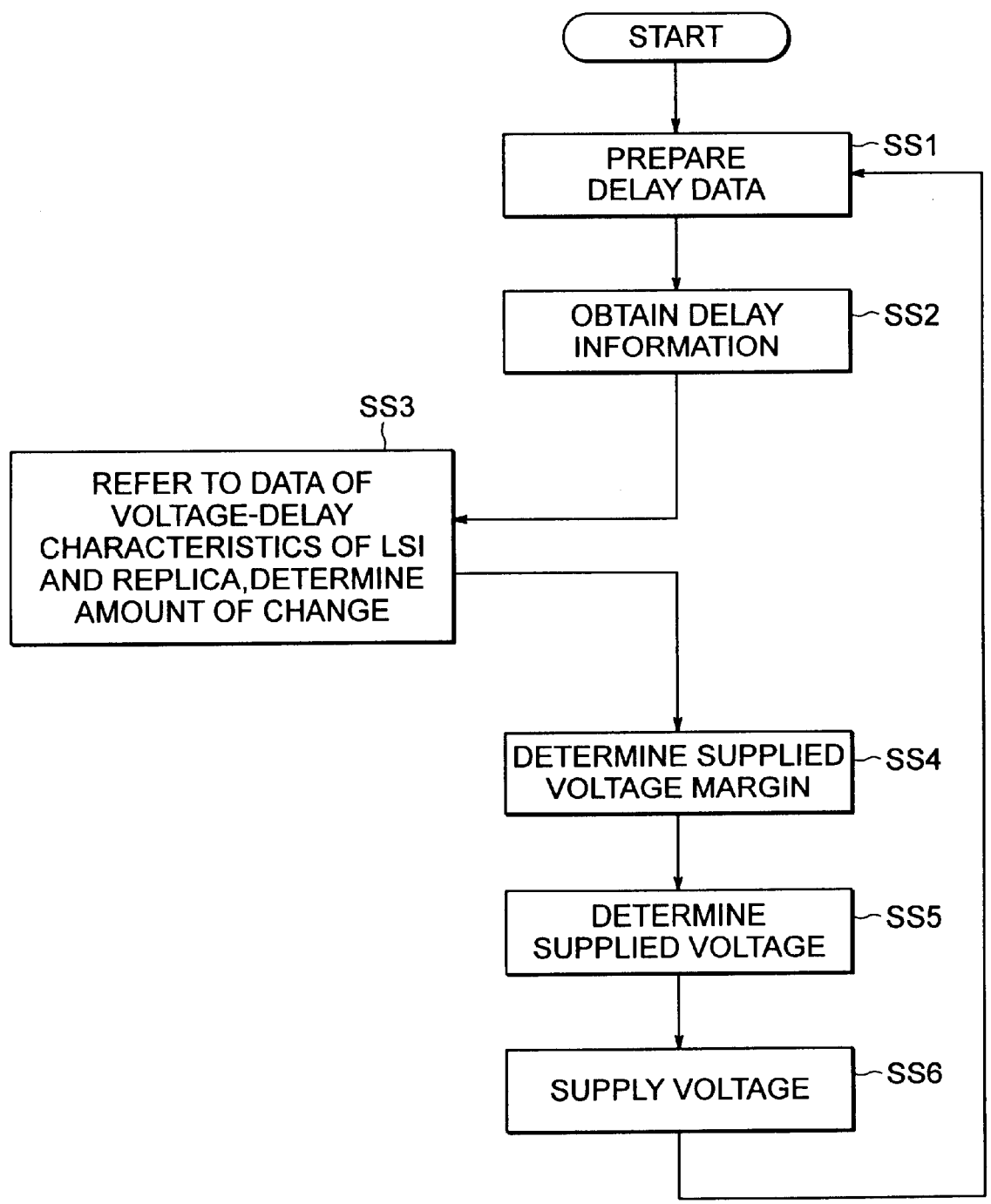
FIG. 5 is a flow chart of an operation of the voltage supply circuit of the second embodiment.

FIG. 5 is a flow chart of the operation of the voltage supply circuit 100*a* of the present embodiment. Below, the operation of the voltage supply circuit 100*a* of the present embodiment will be explained in detail with reference to FIGS. 4 and 5.

First, at step SS1, the delay time of the replica circuit 20 is detected by the delay detection circuit 40 and delay data $D_L$ is prepared in accordance therewith.

At step SS2, the control circuit 50*a* receives the delay data $D_L$ and obtains delay information. Next, based on the obtained delay information, as shown at step SS3, it refers to the correlated data of changes in voltage and changes in delay time under different conditions to find the amount of change of voltage and the amount of change of the delay and, based on these, determines the margin of a supplied voltage at step SS4.

The control circuit 50*a* determines a supplied voltage in accordance with the above information (step SS5) and output a control signal $S_C$ to the voltage generation circuit 60.

The voltage generation circuit 60 controls the generated voltage in accordance with the control signal $S_C$ from the control circuit 50*a* and supplies the voltage as an operating power source voltage to the LSI 10 and the replica circuit 20 (step SS6).

FIG. 6 is a view of an example of a database for finding a power source voltage $V_{DD}$ to be supplied to the actual LSI 10 based on the detected delay time of the replica circuit. FIG. 6(*a*) is a view of an example of a database indicating the relationship of the actual voltage for supply to the LSI 10 and the voltage for supply to the replica circuit 20. As shown in the figure, for example when 3.0 V of a supplied voltage is necessary for the replica circuit, based on the delay time of the replica circuit 20, the voltage to be supplied to the LSI 10 is 3.3 V. Under other operating conditions, when 3.2 V of a supplied voltage is necessary for the replica circuit, the voltage to be supplied to the LSI 10 is 3.6 V. In this way, the voltage to be supplied to the actual LSI can be found from the voltage for supply to the replica circuit 20 in accordance with the database in FIG. 6(a).

FIG. 6(b) is an example of a database constructed by differential data of the voltage to be supplied to the actual LSI and a voltage supplied to the replica circuit. As shown in the figure, for example, in accordance with the detected delay time of the replica circuit 20, when a voltage of 3.0 V is required to be supplied to the replica circuit, the voltage supplied to the actual LSI is found to be a voltage higher than that by 0.3 V, that is, 3.3 V. Under other conditions, when a voltage of 3.2 V is required to be supplied to the replica circuit, it can be judged that a voltage to be supplied to the LSI 10 is a voltage further higher than that by 0.4 V, that is, 3.6 V should be supplied.

FIG. 7 is a graph of the voltages to be supplied to the replica circuit 20 and the LSI 10 under two operating conditions 3 and 4. In FIG. 7, the power source voltage-delay characteristic of the replica circuit under operating conditions 3 is indicated by a line G, and the power source voltage-delay characteristic of the critical path of an actual LSI is indicated by a line E. Also, the power source voltage-delay characteristic of the replica circuit under the operating conditions 4 is indicated by a line H, and the power source voltage-delay characteristic of the critical path of an actual LSI is indicated by a line F. As shown in the figure, under the operating conditions 3, when operating by the same delay time and, for example, a power source voltage of 3.2 V has to be supplied to the replica circuit in a cycle T, a power source voltage of 3.6 V should be supplied to the actual LSI. Under the operating conditions 4, when a power source voltage of 3.6 V should be supplied to the replica circuit, a power source voltage of 3.3 V should be supplied to the actual LSI.

In the control circuit 50a, to find the voltage to be supplied to an actual LSI 10 in accordance with the delay time of the replica circuit 20, it is also possible to calculate the voltage to be supplied to the LSI based on the relationship of a supplied voltage of the replica circuit and a supplied voltage of the LSI found in advance in addition to the above database. For example, when the voltage to be supplied to the LSI is $V_{DDL}$ and the voltage to be supplied to the replica circuit is $V_{DDR}$, the relationship of the voltage $V_{DDL}$ supplied to the LSI and the voltage $V_{DDR}$ supplied to the replica circuit can be defined by the relationship expressed by the following formula in accordance with delay characteristics of the LSI and replica circuit found in advance:

$$V_{DDL} = V_{DDR} \times 0.5 + 1.8 \qquad (1)$$

The control circuit 50a first calculates a voltage $V_{DDR}$ to be supplied to the replica circuit 20 in accordance with the detected delay time of the replica circuit 20. Then, it finds the voltage $V_{DDL}$ to be supplied to the actual LSI in accordance with the formula (1). The control circuit 50a outputs a control signal $S_C$ to the voltage generation circuit 60 in accordance with the output supplied voltage $V_{DDL}$. The voltage generation circuit 60 controls the level of the voltage generated in accordance with the control signal $S_C$ and supplies the generated voltage as a power source voltage to the LSI 10 and the replica circuit 20.

As explained above, according to the present embodiment, a replica circuit 20 for monitoring the delay time of the critical path of the LSI 10 is provided, the delay time of the replica circuit 20 is detected by the delay detection circuit 40, a supplied voltage by which the delay time of the replica circuit 20 satisfies a predetermined reference is found in accordance with the detected delay time, the voltage to be supplied to the actual LSI 10 is found based on the database or a formula found in advance, and, in accordance therewith, a control signal $S_C$ is output. The voltage generation circuit 60 controls the voltage generated in accordance with the control signal and supplies the same as an operating power source voltage to the LSI 10, so the voltage to be supplied to the LSI is found in accordance with an error of the delay time of the replica circuit and the delay time of the critical path of the LSI caused by variability etc. in the production process, a minimum power source voltage necessary for operating the LSI normally under a variety of operating conditions can be supplied, and a lower power consumption can be realized.

Third Embodiment

Figure 8:
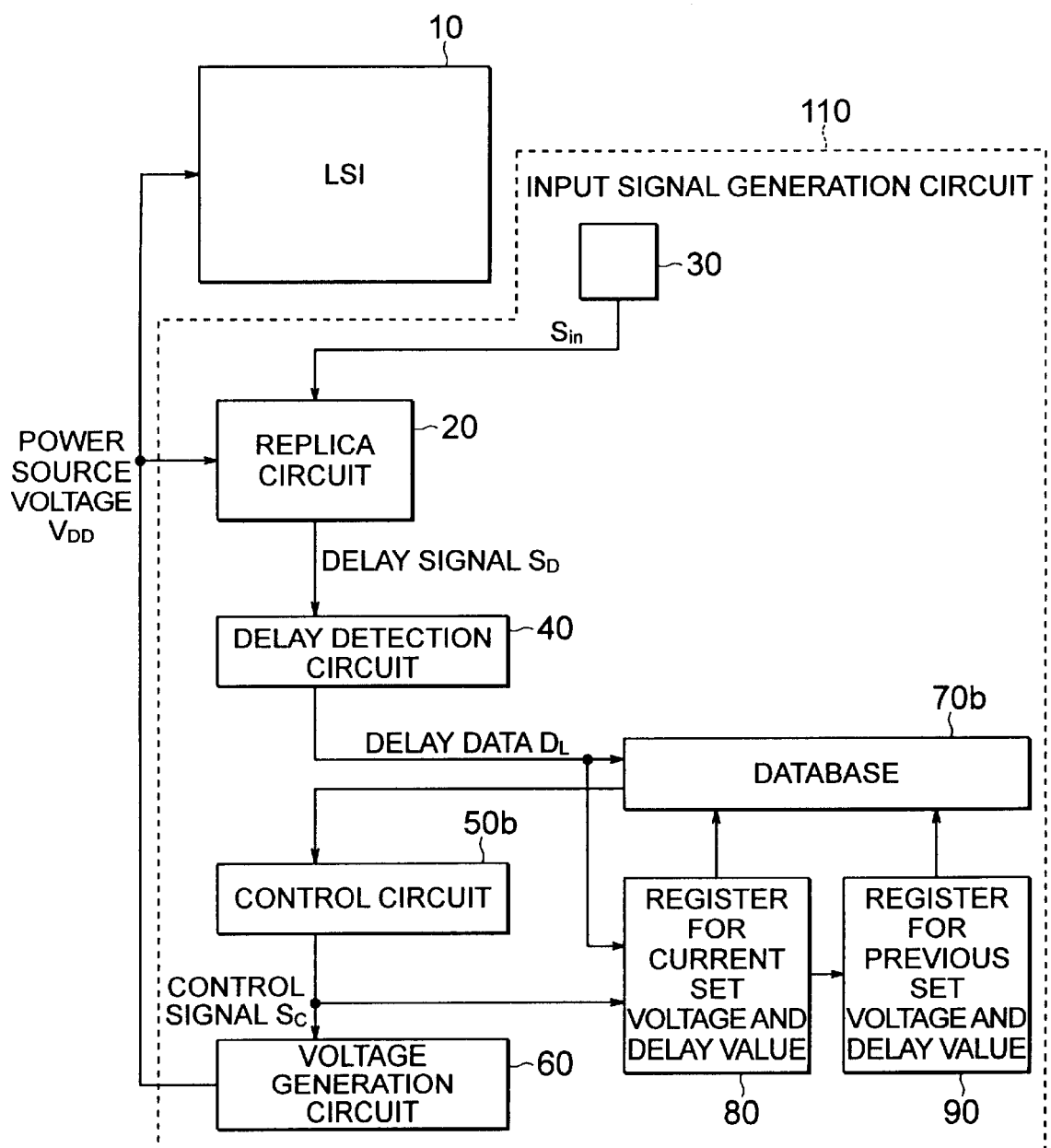
FIG. 8 is a circuit diagram of a third embodiment of a voltage supply circuit according to the present invention.

FIG. 8 is a circuit diagram of a third embodiment of a voltage supply circuit according to the present invention.

As shown in the figure, a voltage supply circuit 110 of the present embodiment comprises a replica circuit 20, an input signal generation circuit 30, a delay detection circuit 40, a control circuit 50b, a voltage generation circuit 60, a database 70b, and registers 80 and 90. A power source voltage $V_{DD}$ output by the voltage supply circuit 100 is supplied to the LSI 10 and the replica circuit 20. The database 70b includes data indicating the relationship of a power source voltage and a delay time under a plurality of different production conditions found in advance. The register 80 stores a power source voltage set by the control circuit 50b the current time and a delay value corresponding thereto, while the register 90 stores a power source voltage set by the control circuit 50b the previous time and a delay value corresponding thereto.

The LSI 10 is a functional circuit having a predetermined processing function and performs predetermined signal processing in accordance with an input signal and outputs the processing result.

The replica circuit 20 is designed corresponding to a critical path of the LSI 10 and is a circuit for monitoring a delay time of the critical path of the LSI 10. The replica circuit 20 and the LSI 10 are supplied with the same operating power source voltage $V_{DD}$, so the replica circuit 20 has almost the same delay time as that of the critical path of the LSI 10 in accordance with a change of the power source voltage $V_{DD}$.

The input signal generation circuit 30 generates a signal $S_{in}$ for input to the replica circuit 20. Here, the input signal $S_{in}$ generated by the input signal generation circuit 30 is, for example, a one shot pulse or a cyclic clock signal.

The replica circuit 20 outputs a delay signal $S_D$ obtained by delaying the input signal $S_{in}$ by a predetermined delay time $T_D$.

The control circuit 50b, in accordance with the delay data $D_L$ output by the delay detection circuit 40, finds an amount of change of a power source voltage and a delay time, refers to data in the database 70b, and outputs a control signal $S_C$ to the voltage generation circuit 60.

The control circuit 50b finds a power source voltage to be supplied to the LSI in accordance with the delay data $D_L$ found from the delay detection circuit 40. Furthermore, based on a power source voltage and a delay time of the previous time and a power source voltage and delay time found the current time stored in the registers 80 and 90, it finds the amount of change of the power source voltage and the amount of change of the delay time in accordance with this, deduces production conditions of the LSI 10, finds the power source voltage to be supplied to the LSI 10 based on the deduced production conditions, and outputs a control signal $S_C$ for controlling the output voltage $V_{DD}$ of the voltage generation circuit 60.

The voltage generation circuit 60 controls the level of the voltage $V_{DD}$ generated in accordance with the control signal $S_C$ from the control circuit 50b and supplies the generated voltage $V_{DD}$ to the LSI 10 and the replica circuit 20.

Figure 9:
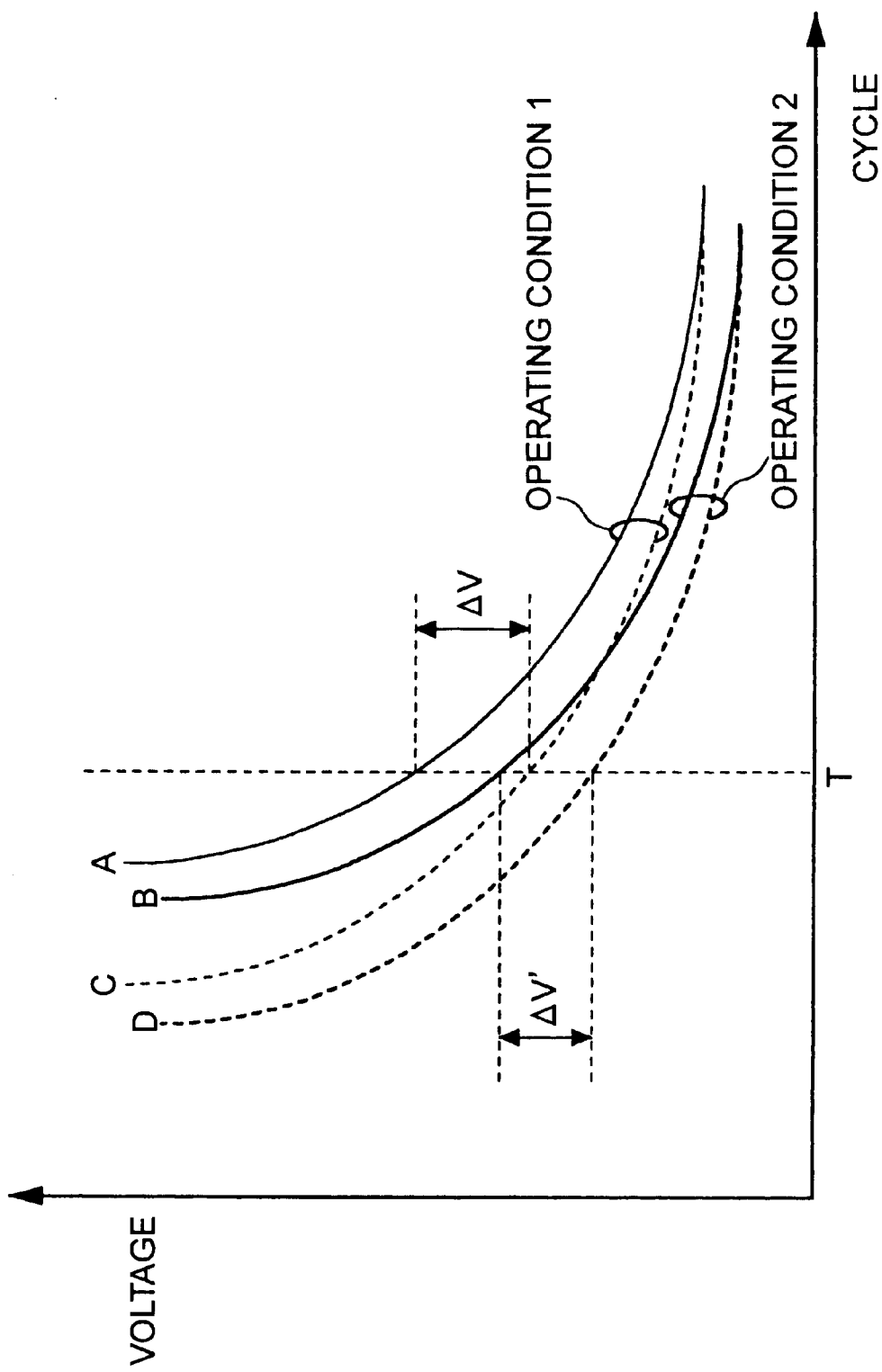
FIG. 9 is a view of a change of delay characteristics of an LSI in accordance with production conditions.
Figure 12:
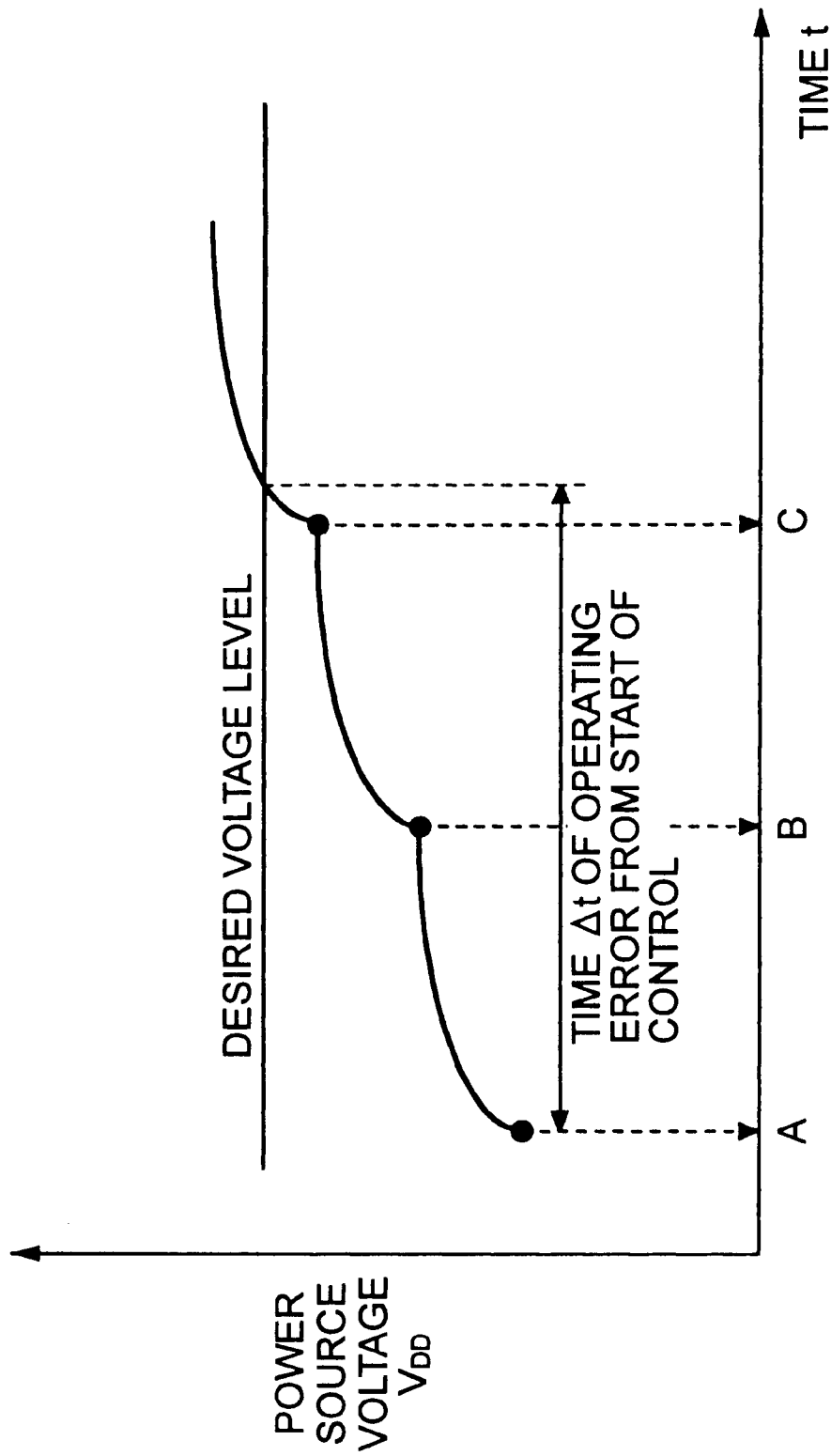
FIG. 12 is a view of a waveform of a supplied voltage of a conventional voltage supply circuit.
Figure 13:
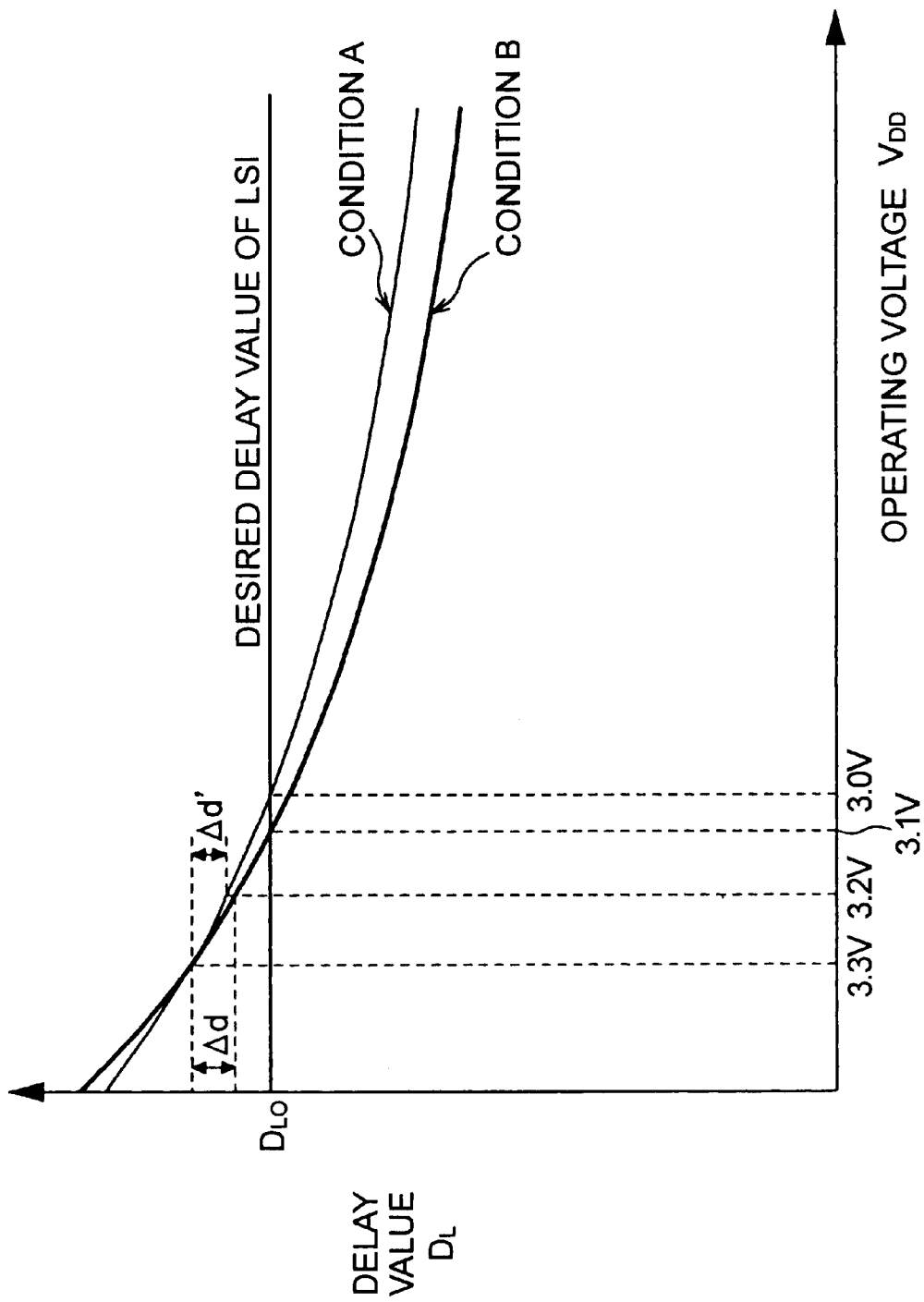
FIG. 13 is a graph of the relationship of an operating voltage of a replica circuit and an operating voltage of an LSI under different operating conditions.
Figure 14:
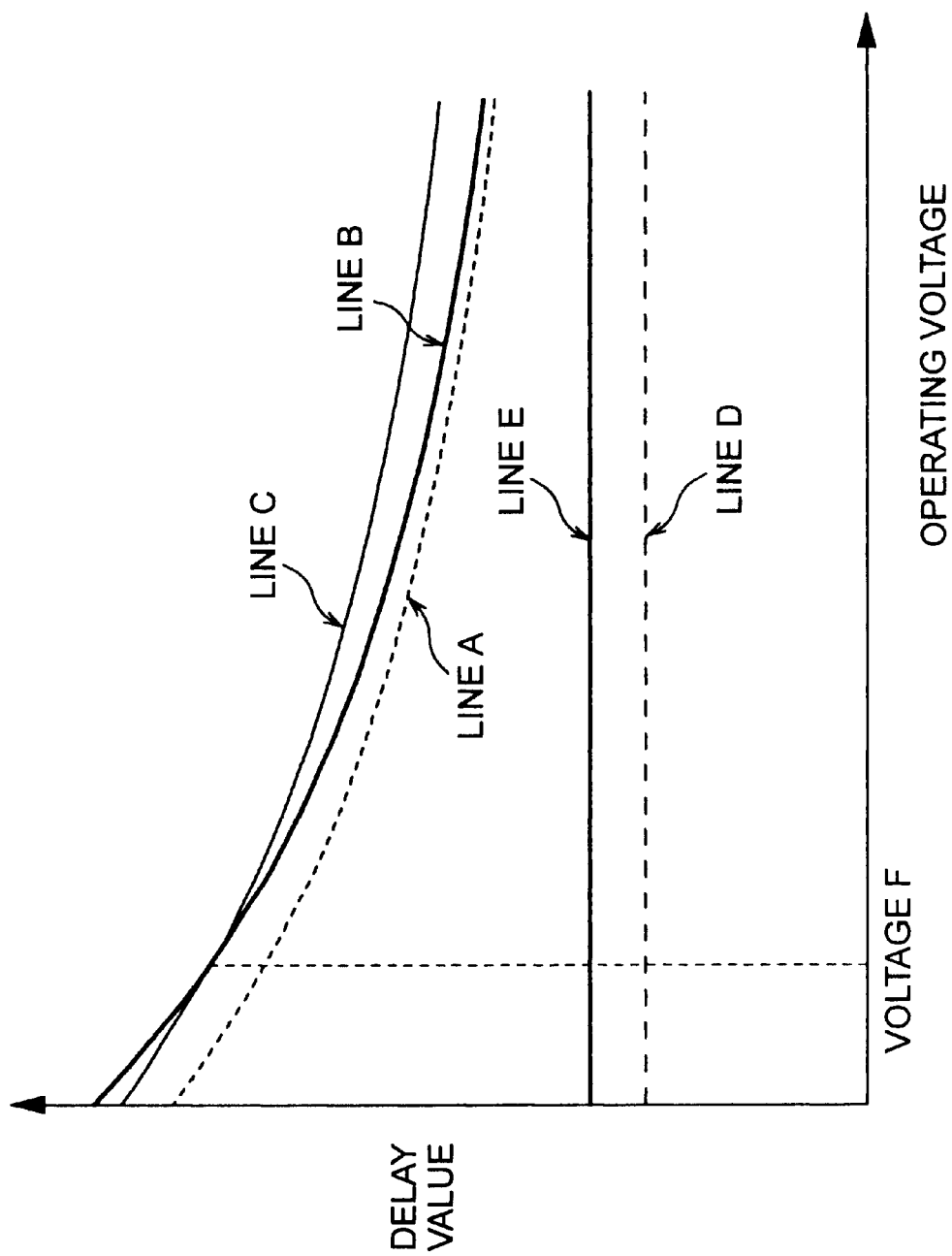
FIG. 14 is a graph of the relationship of an operating voltage and delay time of an LSI.

FIG. 9 is a graph of the delay characteristic of the LSI, that is, the relationship of an operating power source voltage $V_{DD}$ of the LSI and the delay value $D_L$. In the ideal case, the delay characteristic of the LSI does not vary due to operating conditions etc. and preferably becomes all equal. However, due to variability in the production process and other causes, the delay characteristic of the LSI differs due to the differences of production conditions etc. even under the same design conditions.

The delay characteristic of an LSI is determined by the current capacity of the transistors, interconnection resistance, and interconnection capacitance. In FIG. 9, one delay characteristic is obtained for an LSI under production conditions A, for example, when the current capacity of the transistors becomes as designed and the interconnection resistance and interconnection capacitance end up larger than the design values. Also, a different delay characteristic is obtained for an LSI from the case of the condition A under production conditions B, for example, when the current capacity of the transistors becomes lower than the design value and the interconnection resistance and interconnection capacitance end up as designed. Namely, even if LSIs have the same design conditions, for example, two delay characteristics may be given under the conditions A and B as shown in FIG. 9 due to differences of the production conditions. Furthermore, to give an LSI a predetermined delay value $D_{L0}$, it is necessary to supply a power source voltage of 3.0 V under the conditions A and a power source voltage of 3.1 V under the conditions B. Accordingly, when controlling the power source voltage supplied in accordance with the delay data $D_L$, it is necessary to obtain the production conditions of the LSI and to find the power source voltage to be supplied to the LSI based on the delay characteristic under the production conditions. Below, a method of finding the production conditions in the voltage supply circuit 110 of the present embodiment will be explained.

In the voltage supply circuit 110 shown in FIG. 8, for example, when detecting a delay time of the replica circuit 20 by the delay detection circuit and controlling the power source voltage $V_{DD}$ to be supplied in accordance with the found delay data $D_L$, the same delay value is obtained under the conditions A and conditions B when a power source voltage of 3.3 V is supplied. At this time, it is not possible to judge under which conditions A or B the LSI 10 was produced. When detecting a delay value $D_L$ when lowering the power source voltage $V_{DD}$ for example by 0.1 V, if the delay value changes exactly by Δd, the LSI can be judged to have been produced under the conditions B, so it is judged that the power source voltage $V_{DD}$ to be supplied to the LSI can be reduced to 3.1 V. Also, when lowering the power source voltage $V_{DD}$ by 0.1 V, if the delay value changes exactly by Δd', it can be judged that the LSI was produced under the conditions A, so it is judged that the power source voltage $V_{DD}$ to be supplied can be reduced to 3.0 V.

In the voltage supply circuit 110 of the present embodiment, a database indicating the relationship of the power source voltage $V_{DD}$ and the delay value $D_L$ under different production conditions of the LSI is prepared in advance. When the voltage supply circuit 110 operates, it is possible to refer to the database so as to find the production conditions of the LSI in accordance with an amount of change of the power source voltage $V_{DD}$ and the amount of change of the delay value corresponding to the amount of change and find the minimum supplied voltage under the obtained production conditions.

FIG. 10 is a view of an example of the database. As shown in the figure, delay values A1 to A17 and B1 to B17 under the respective production conditions A and B are found in advance for different supply power source voltages. As shown in the figure, for example when the supplied voltage is 3.3 V, the delay value becomes the same A9 under both conditions A and B, so the production conditions of the LSI cannot be deduced only by this information. When the supplied voltage slightly changes, for example, when the supplied voltage is changed by 0.1 V, by detecting the change of the delay value in accordance therewith, the amount of change of the delay value with respect to an amount of change of the voltage can be found. When information of the amount of change of the power source voltage $V_{DD}$ and the amount of change of the delay value $D_L$ is obtained, the production conditions can be deduced based on the database shown in FIG. 10, and a minimum power source voltage necessary for the LSI to be able to operate normally can be found under the deduced production conditions.

FIG. 11 is a flowchart of the flow of voltage control in the voltage supply circuit of the present embodiment. Below, the operation of the voltage supply circuit 110 of the present embodiment will be explained with reference to FIG. 11.

First, at step SP1, a delay time of the replica circuit 20 is detected by the delay detection circuit 40 and delay data $D_L$ is prepared in accordance therewith.

At step SP2, the control circuit 50b receives delay data $D_L$ and obtains the delay information. Then, based on the obtained delay information, as shown at step SP3, it refers to the correlated data of the change in voltage and change in delay time under the different conditions to find the amount of change of voltage and amount of change of delay, and, based thereon, obtains the production conditions of the actual LSI at step SP4.

The control circuit 50b determines the supplied voltage in accordance with the above information and outputs a control signal $S_C$ to the voltage generation circuit 60 (step SP5).

The voltage generation circuit 60 controls the voltage generated in accordance with the control signal $S_C$ from the control circuit 50b and supplies the voltage as an operating power source voltage to the LSI 10 and the replica 20 (step SP6).

As explained above, according to the present embodiment, a replica circuit 20 for monitoring the delay time of the critical path of the LSI 10 is provided, the delay time of the replica circuit 20 is detected by the delay detection circuit 40, delay information of the LSI is found, production conditions are deduced based on the database indicating the relationship of an operating power source voltage and the delay value under different production conditions found in advance in accordance with an amount of change of the delay value with respect to an amount of change of the supplied voltage, and the voltage generation circuit 60 is made to generate the same, so it is possible to deal with changes of delay characteristics of LSIs caused by variability in the production process, a minimum power source voltage required to normally operate the LSI under a variety of operating conditions can be supplied, and a lower power consumption can be realized.

INDUSTRIAL APPLICABILITY

As explained above, according to the voltage supply circuit and voltage control method of the present invention, a voltage supply circuit capable of supplying the minimum voltage necessary for maintaining normal operation of an LSI, controlling the supplied voltage to rapidly rise when the operating speed of the LSI declines due to a load change etc., greatly reduced in the probability of occurrence of operating error in the LSI, realizing a lower power consumption, and improved in stability of operation can be realized.

Also, according to the voltage supply circuit and the voltage control method of the present invention, the variability of delay times of the critical path of the replica circuit and the actual LSI can be corrected, a minimum power source voltage enabling normal operation of the LSI to be maintained under a variety of operating conditions can be supplied, error in estimation of the delay time due to production variability can be prevented, and the most suitable operating power source voltage can be supplied to the LSI to realize a lower power consumption.

Furthermore, according to the voltage supply circuit and the voltage control method of the present invention, it is possible to deal with fluctuations of the delay characteristic due to variability of normal operating conditions of the LSI, to find an amount of change of an operating voltage and an amount of change of a delay value in accordance with detected delay information, to deduce production conditions of the LSI in accordance with a database found in advance, and to supply a minimum power source voltage under the deduced production conditions, so there are advantages that error in estimation of the delay time due to variability of production conditions can be prevented and the most suitable operating power source voltage can be supplied to the LSI to realize a lower power consumption.

LIST OF REFERENCES

10 . . . LSI
20 . . . replica circuit
30 . . . input signal generation circuit
40 . . . delay detection circuit
50, 50a, 50b . . . control circuit
60 . . . voltage generation circuit
70a, 70b . . . database
80, 90 . . . register
100, 100a, 110 . . . voltage supply circuit
$V_{DD}$ . . . power source voltage

What is claimed is:

1. A voltage supply circuit comprising:
    a functional circuit for performing predetermined processing in accordance with an input signal at an operating speed based on a power source voltage supplied and outputting a processing result after a predetermined delay time from when said input signal is received,
    a delay detection circuit for detecting a delay time of said functional circuit,
    a control circuit for outputting a control signal to control said power source voltage to raise or lower it in accordance with a delay time detected by said delay detection circuit and to make an amount of change at the time of raising said power source voltage larger than an amount of change at the time of lowering it, and
    a voltage generation circuit for generating a voltage in accordance with said control signal and supplying it as said power source voltage to said functional circuit.

2. A voltage supply circuit as set forth in claim 1, wherein said delay detection circuit comprises
    a replica circuit having substantially the same delay time as that of a critical path of said functional circuit and
    a delay time detection circuit for inputting a predetermined signal to said replica circuit and detecting a delay time of an output signal corresponding to the input signal.

3. A voltage supply circuit as set forth in claim 1, wherein said control circuit
    comprises a comparison circuit for comparing a delay time detected by said delay time detection circuit with a reference value set in advance, and
    outputs a control signal to raise the output voltage of said voltage generation circuit by a first amount of change when the result of said comparison is that said detected delay time is larger than said reference value and to lower the output voltage of said voltage generation circuit by a second amount of change smaller than said first amount of change when the result is that said detected delay time is smaller than said reference value.

4. A voltage supply circuit as set forth in claim 1, wherein said control circuit comprises
    a means for finding a difference of a delay time detected by said delay time detection circuit and a reference value set in advance and
    a voltage change determining means for setting said amount of change of voltage in accordance with said difference of the delay time and the reference value.

5. A voltage supply circuit comprising
    a functional circuit for performing predetermined processing in accordance with an input signal at an operating speed based on a power source voltage supplied and outputting a processing result after a predetermined delay time from when said input signal is received,
    a replica circuit having almost the same delay time as that of a critical path of said functional circuit,
    a delay detection circuit for detecting a delay time of said replica circuit,
    a control circuit for finding a power source voltage by which a delay time of the replica circuit satisfies a predetermined reference value in accordance with a delay time detected by said delay detection circuit, finding a power source voltage to be supplied to said functional circuit based on a relationship of a power source voltage of said replica circuit and a power source voltage of said functional circuit under the same operating conditions, and outputting a control signal in accordance with the power source voltage, and
    a voltage generation circuit for generating a voltage in accordance with said control signal and supplying it as said power source voltage to said functional circuit.

6. A voltage supply circuit as set forth in claim 5, further comprising
    a database indicating a relationship of said replica circuit and a power source voltage supplied to said functional circuit so that a delay time of said replica circuit and a delay time of the critical path of said functional circuit becomes equal under the same operating conditions, wherein
    said control circuit finds a voltage for supplying to said functional circuit corresponding to said found voltage for supplying to said replica circuit based on said database.

7. A voltage supply circuit as set forth in claim 5, further comprising a formula indicating a relationship of said replica circuit and a power source voltage supplied to said functional circuit so that a delay time of said replica circuit and a delay time of the critical path of said functional circuit becomes equal under the same operating conditions, wherein said control circuit finds a voltage for supplying to said functional circuit corresponding to said found voltage for supplying to said replica circuit based on said formula.

8. A voltage supply circuit comprising a functional circuit for performing predetermined processing in accordance with an input signal at an operating speed based on a power source voltage supplied and outputting a processing result after a predetermined delay time from when said input signal is received, a delay detection circuit for detecting a delay time of said functional circuit, a control circuit for obtaining an amount of change of a delay time corresponding to an amount of change of said power source voltage in accordance with a delay time detected by said delay detection circuit, deducing production conditions based on information regarding a power source voltage and a delay time under different production conditions found in advance, finding a power source voltage to be supplied to said functional circuit under the deduced production conditions, and outputting a control signal in accordance with the power source voltage, and a voltage generation circuit for generating a voltage in accordance with said control signal and supplying it as said power source voltage to said functional circuit.

9. A voltage supply circuit as set forth in claim 8, further comprising a database indicating a relationship of said power source voltage and delay time under different operating conditions, wherein said control circuit deduces production conditions based on an amount of change of said found power source voltage and an amount of change of said delay time and said database.

10. A voltage supply circuit as set forth in claim 9, wherein said control circuit obtains a power source voltage by which said functional circuit normally operates under the production conditions based on said database in accordance with said deduced production conditions.

11. A voltage supply circuit as set forth in claim 8, wherein said control circuit comprises a first storage means for storing a delay time detected at a previous time and a set power source voltage and a second storage means for storing a delay time detected at a current time and a set power source voltage.

12. A voltage supply circuit as set forth in claim 11, wherein said control circuit calculates an amount of change of said power source voltage and an amount of change of a delay time in accordance therewith in accordance with data stored in said first and second storage means.

13. A voltage supply circuit as set forth in claim 8, further comprising a replica circuit based on the critical path of said functional circuit.

14. A voltage supply circuit as set forth in claim 13, wherein said delay detection circuit detects a delay time of said replica circuit.

15. A voltage control method for supplying a minimum power source voltage by which a functional circuit for performing a predetermined function normally operates, including the steps of detecting a delay time of said functional circuit, raising or lowering said power source voltage in accordance with said detected delay time and setting an amount of change at the time of raising said power source voltage larger than an amount of change at the time of lowering it, and changing said power source voltage in accordance with said set amount of change and supplying it to said functional circuit.

16. A voltage control method as set forth in claim 15, including a detecting step for detecting a delay time of a replica circuit having substantially the same delay time as that of the critical path of said functional circuit.

17. A voltage control method as set forth in claim 15, including a step of comparing said detected delay time and a predetermined reference value and determining an amount of change of said power source voltage in accordance with the result of comparison.

18. A voltage control method for supplying a minimum power source voltage by which a functional circuit for performing a predetermined function normally operates, including the steps of detecting a delay time of a replica circuit for monitoring a delay time of said functional circuit, finding a power source voltage by which a delay time of the replica circuit satisfies a predetermined reference value in accordance with a detected delay time of said replica circuit, finding a power source voltage to be supplied to said functional circuit corresponding to said found power source voltage of the replica circuit based on a relationship of a power source voltage supplied to said replica circuit and a power source voltage supplied to said functional circuit under the same operating conditions, and generating said found power source voltage to be supplied to the functional circuit and supplying it to said functional circuit.

19. A voltage control method as set forth in claim 18, including a step of finding a database indicating a relationship of a power source voltage supplied to said replica circuit and said functional circuit so that a delay time of said replica circuit and a delay time of the critical path of said functional circuit become equal under the same operating conditions.

20. A voltage control method as set forth in claim 18, including a step of finding a formula indicating a relationship of a power source voltage supplied to said replica circuit and said functional circuit so that a delay time of said replica circuit and a delay time of the critical path of said functional circuit become equal under the same operating conditions.

21. A voltage control method for supplying a minimum power source voltage by which a functional circuit for performing a predetermined function operates normally, including the steps of detecting a delay time of said functional circuit, obtaining an amount of change of a power source voltage supplied to the functional circuit and an amount of change of a delay time corresponding to the amount of change of the power source voltage in accordance with said detected delay time of the functional circuit, deducing production conditions based on said amount of change of the power source voltage and an amount of change of a delay time and a relation between the power source voltage and the delay time obtained in advance and finding a power source voltage to be supplied to said functional circuit under the deduced production conditions, and generating said power source voltage to be supplied and supplying it to said functional circuit.

22. A voltage control method as set forth in claim 21, including a step of finding a database indicating a relationship of the power source voltage of said functional circuit and the delay time under different operating conditions.

23. A voltage control method as set forth in claim 21, further including the step of providing a replica circuit for monitoring the critical path of said functional circuit and detecting a delay time of said replica circuit at a predetermined power source voltage.

* * * * *